US011320128B2

(12) United States Patent
Wang et al.

(10) Patent No.: US 11,320,128 B2
(45) Date of Patent: May 3, 2022

(54) PLANT GROWTH LAMP HAVING CONCENTRICAL RINGS OF DIFFERENT COLORS LED CHIPS

(71) Applicants: Xiamen Hi-Light Lighting Co., Ltd, Fujian (CN); Seagine (Xiamen) Technology Co., Ltd, Fujian (CN)

(72) Inventors: Peiyuan Wang, Fujian (CN); Xiaowei Li, Fujian (CN); Zongshan Lian, Fujian (CN); Ting Ding, Fujian (CN); Zhijun Yao, Fujian (CN)

(73) Assignees: Xiamen Hi-Light Lighting Co., Ltd, Xiamen (CN); Seagine (Xiamen) Technology Co., Ltd, Xiamen (CN)

( * ) Notice: Subject to any disclaimer, the term of this patent is extended or adjusted under 35 U.S.C. 154(b) by 73 days.

(21) Appl. No.: 16/995,738

(22) Filed: Aug. 17, 2020

(65) Prior Publication Data

US 2021/0356107 A1 Nov. 18, 2021

(30) Foreign Application Priority Data

May 13, 2020 (CN) .......................... 202020793099.6

(51) Int. Cl.
*A01G 7/04* (2006.01)
*F21V 23/04* (2006.01)
*F21V 29/76* (2015.01)

(52) U.S. Cl.
CPC .............. *F21V 23/04* (2013.01); *A01G 7/045* (2013.01); *F21V 29/763* (2015.01)

(58) Field of Classification Search
CPC .............. F21V 23/005; F21Y 2105/18; F21Y 2113/10; A01G 7/045; A01G 9/249
See application file for complete search history.

(56) References Cited

U.S. PATENT DOCUMENTS

| 5,012,609 | A  | * | 5/1991  | Ignatius  | A01G 7/045 47/1.01 R |
| 8,297,782 | B2 | * | 10/2012 | Bafetti   | A01G 7/045 362/231 |
| 8,453,376 | B2 | * | 6/2013  | Chen      | A01G 7/045 47/58.1 LS |
| 9,320,109 | B2 | * | 4/2016  | Lai       | H05B 45/20 |
| 9,416,948 | B2 | * | 8/2016  | Nakamura  | H01L 25/0753 |
| 9,453,635 | B1 | * | 9/2016  | Fuller    | F21V 29/71 |
| 9,784,416 | B2 | * | 10/2017 | Deregibus | F21K 9/00 |
| 10,111,392 | B2 | * | 10/2018 | Szeto    | A01G 7/045 |
| 10,718,474 | B1 | * | 7/2020  | Von Fange | H05B 45/56 |
| 2006/0002110 | A1 | * | 1/2006 | Dowling  | H05B 47/155 362/249.05 |

(Continued)

Primary Examiner — Ismael Negron

(57) ABSTRACT

A lamp includes a main lamp body, a plurality of red light sources, a plurality of blue light sources, a plurality of white light sources, a driving board connected to the light sources to drive them to emit light, a main control circuit configured to control the driving board, and a switching circuit with a multi-position switch. The red, blue and white light sources are arranged in corresponding concentrical rings, with the red light sources in a central ring, the blue light sources in a middle ring, and the white sources in an outer ring. The multi-position switch is switched to provide input signals to the main control circuit, such that the light sources are driven to output different spectrums to meet desired plant growth spectrums.

8 Claims, 6 Drawing Sheets

(56) References Cited

U.S. PATENT DOCUMENTS

2012/0020071 A1* 1/2012 Mckenzie .............. A01G 7/045
  362/231
2013/0170200 A1* 7/2013 Moeck ...................... F21V 9/00
  362/231
2016/0278304 A1* 9/2016 Elsegood ............... A01G 7/045

* cited by examiner

PLANT GROWTH LAMP HAVING CONCENTRICAL RINGS OF DIFFERENT COLORS LED CHIPS

CROSS REFERENCE TO RELATED APPLICATIONS

The present application claims the benefit of Chinese Patent Application No. 202020793099.6 filed on May 13, 2020, the contents of which are incorporated herein by reference in their entirety.

TECHNICAL FIELD

The application relates to the technical field of plant growth lamps, in particular to a plant growth lamp.

DESCRIPTION OF RELATED ART

People have different demands on crops in different seasons. Through a control over lighting, the progress of seeding, growing, flowering and fruit bearing of the crops can be controlled. Research indicates that plant growth lamps with different wavelengths can be selected to obtain wavelengths which can promote seeding, growing, flowering and fruit bearing of the crops, and that a certain number of plant growth lamps can be combined to output different spectrums to satisfy the needs of the crops on the spectrums within different wavelength ranges in different stages, thus shortening the growth cycles of the crops and increasing the yield of the crops in a short time.

At present, during cultivation of the crops, to satisfy the needs of the crops on different spectrums in different stages, it is necessary to replace plant growth lamps with different wavelengths repeatedly. Consequentially, operation is troublesome, many spare plant growth lamps with different wavelengths are needed, and the cost is high.

BRIEF SUMMARY OF THE APPLICATION

In view of this, it is necessary to provide a novel plant growth lamp which can independently output different wavelengths and spectrums by means of reasonable layout and cooperative operation of all structures to satisfy the needs of crops on the spectrums in different stages, thus reducing operating and economic costs of plant growth lamp replacement.

To settle the above technical issue, the application provides a plant growth lamp comprising a main lamp body, light sources, a switching circuit, and a driving board, wherein the driving board is connected to the light sources to drive the light sources to emit light; the switching circuit includes a multi-position switch; the light sources include a red light source, a blue light source, and a white light source; the driving board is provided with a driving circuit, a main control circuit, and switch circuits, wherein the switching circuit, the switch circuits, and the driving circuit are respectively connected to the main control circuit, the switch circuits include a first switch circuit, a second switch circuit, and a third switch circuit which are respectively used to control the operating states of the red light source, the blue light source, and the white light source, and the main control circuit correspondingly controls on-off of the first switch circuit, the second switch circuit, and the third switch circuit according to input signals provided by the switching circuit.

In an embodiment, the plant growth lamp further comprises a light source board. The red light source is composed of a plurality of red light sources, the blue light source is composed of a plurality of blue light sources, and the white light source is composed of a plurality of white light sources; the plurality of red light sources, the plurality of blue light sources, and the plurality of white light sources are respectively arranged annularly; and a red light source ring, a white light source ring, a blue light source ring, and a white light source ring are sequentially and concentrically arranged on the light source board from the center of the light source board to outside.

In an embodiment, the number ratio of the red light sources, the blue light sources, and the white light sources is 26:26:65.

In an embodiment, the main control circuit is implemented based on a single-chip microcomputer.

In an embodiment, the first switch circuit, the second switch circuit, and the third switch circuit are respectively implemented based on MOS transistors.

In an embodiment, the plant growth lamp further comprises a switch board on which the multi-position switch is arranged; the main lamp body includes a bulb cover, a heat sink, an upper driving shell, and a lamp cap, wherein the upper driving shell is arranged in the conical heat sink and allows the driving board to be inserted thereinto; the light source board is arranged on the heat sink covered with the bulb cover; the switch board is inserted into the top of the upper driving shell; a switch cap of the multi-position switch penetrates through a recess hole in the side face of the heat sink; and the lamp cap is arranged at the top of the heat sink.

In an embodiment, the main lamp body further includes an upper lamp cap cover, which covers the top of the heat sink and has a top screwed with the lamp cap.

In an embodiment, the main lamp body includes a bulb cover, a heat sink, and a lamp cap, wherein the driving board and the light source board are arranged in the conical heat sink covered with the bulb cover; the multi-position switch is arranged on the driving board; a switch cap of the multi-position switch penetrates through a recess hole in the side wall of the heat sink; and the lamp cap is screwed to the top of the heat sink.

In an embodiment, the light source board is coated with heat-conducting silicone grease.

The application has the following beneficial effects:

The multi-position switch is switched to change the signals input to the main control circuit, which in turn correspondingly controls the on-off of the switch circuits to drive different light sources to output different spectrums, so that the plant growth lamp can independently output different spectrums to satisfy the needs of crops on the spectrums in different stages, thus reducing operating and economic costs of plant growth lamp replacement.

BRIEF DESCRIPTION OF THE SEVERAL VIEWS OF THE DRAWINGS

For the sake of a clearer explanation of the technical solutions of the specific embodiments of the application or the prior art, a brief description of the accompanying drawings required by the description of the specific embodiments or the prior art is given below. Clearly, the accompanying drawings in the following description are only used to illustrate some embodiments of the application, and those ordinarily skilled in the art can acquire other accompanying drawings according to the following ones without creative labor.

DETAILED DESCRIPTION OF THE APPLICATION

The technical solutions of the application are clearly and completely described below with reference to the accompanying drawings. Clearly, the embodiments in the following description are only illustrative ones, and are not all possible ones of the application. Based on the embodiments in the application, all other embodiments obtained by those ordinarily skilled in the art without creative labor should also fall within the protection scope of the application.

It should be noted that the directional or positional relations indicated by the terms such as "center", "upper", "lower", "left", "right", "vertical", "horizontal", "internal", and "external" are based on directional or positional relations shown in the accompanying drawings, these terms are only used to facilitate and simplify the description of the application, do not indicate or imply that devices or elements referred to must have specific directions or must be configured and operated in specific directions, and thus should not to be understood as limitations of the application. Furthermore, the terms "first", "second", and "third" are only used for the purpose of description, and do not indicate or imply relative importance.

It should also be noted that "installation", "connected", and "connection" in the description of the application ought to be broadly understood, unless otherwise clearly specified and defined. For instance, "connection" may refer to fixed connection, detachable connection or integral connection, mechanical connection or electrical connection, direct connection or indirect connection through a medium, or internal communication of two components. Those ordinarily skilled in the art can understand the specific meanings of these terms in the application as the case may be.

In addition, the technical features involved in the following embodiments of the application can be combined without conflicting with each other.

Embodiment 1

Figure 1:
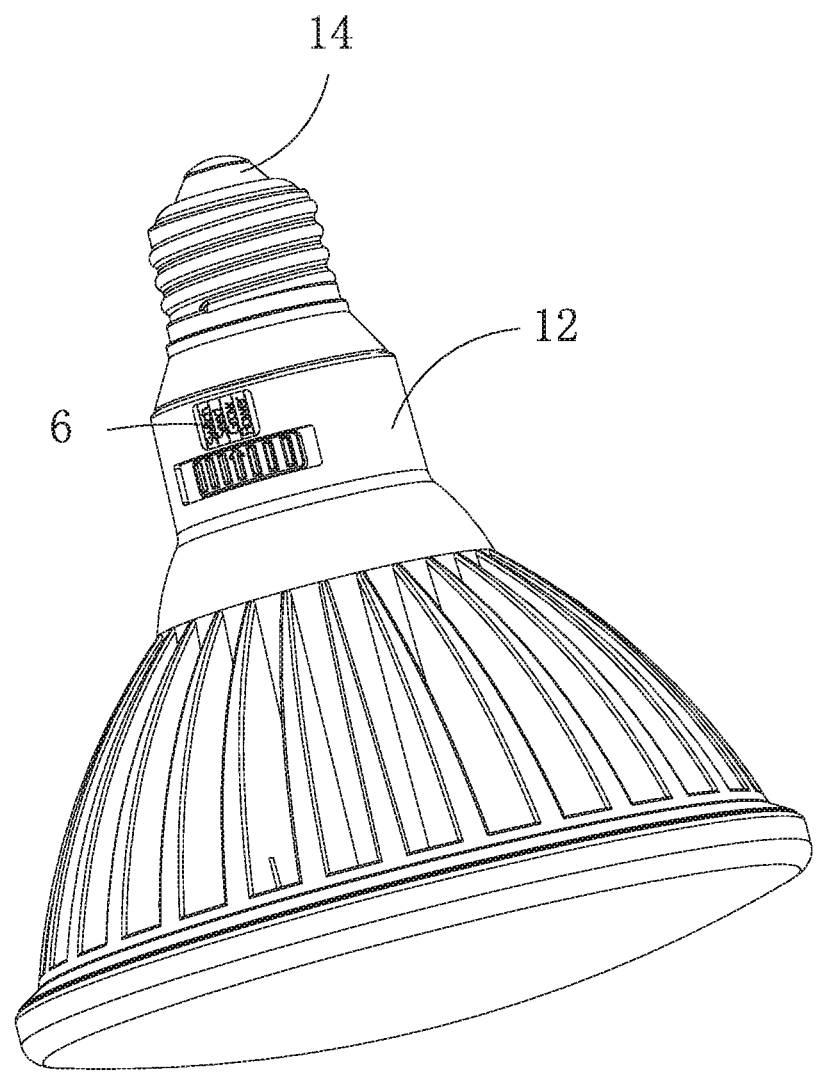
FIG. 1 is a perspective view of Embodiment 1 of the application.
Figure 2:
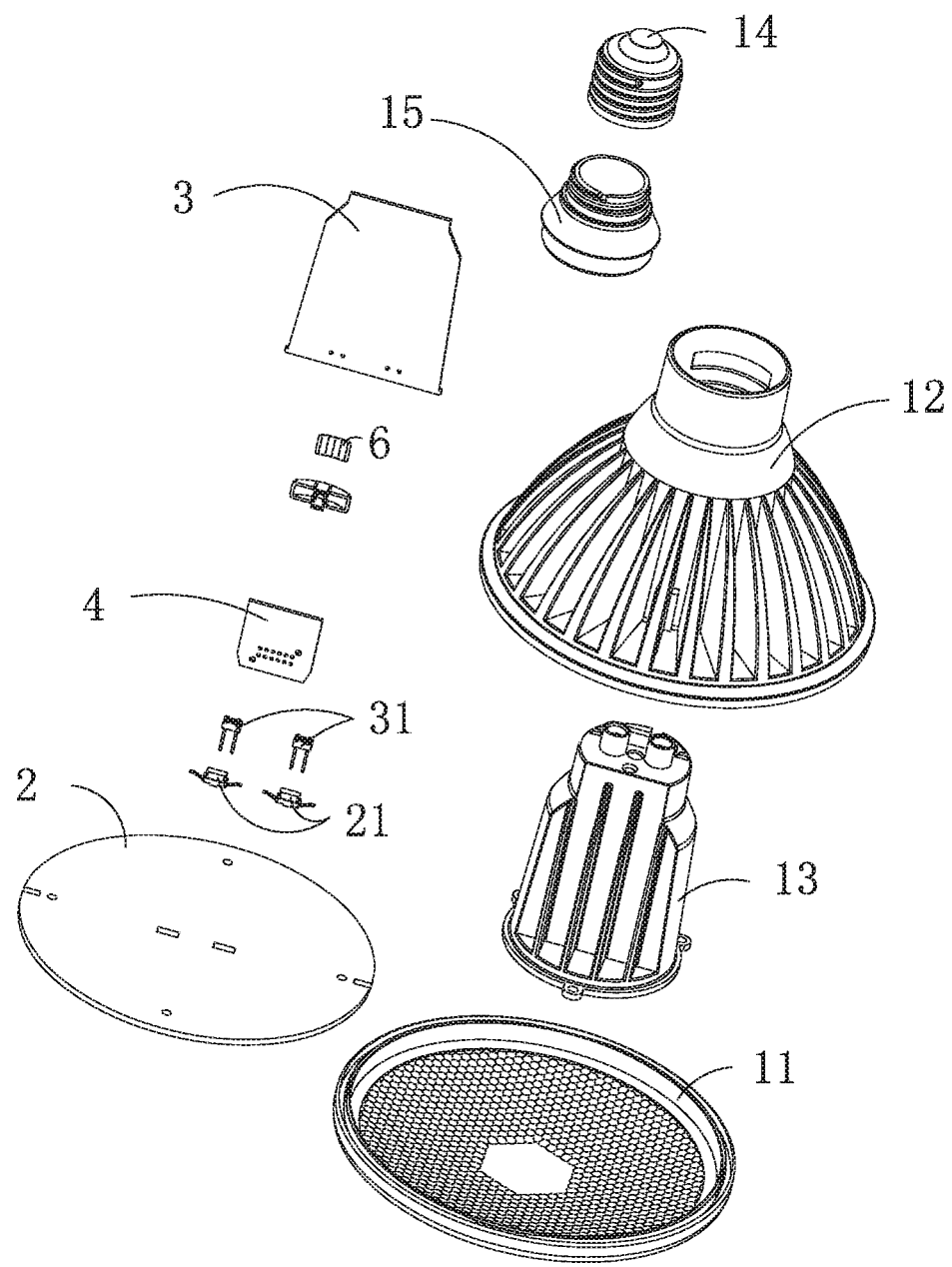
FIG. 2 is an exploded view of Embodiment 1 of the application.
Figure 3:
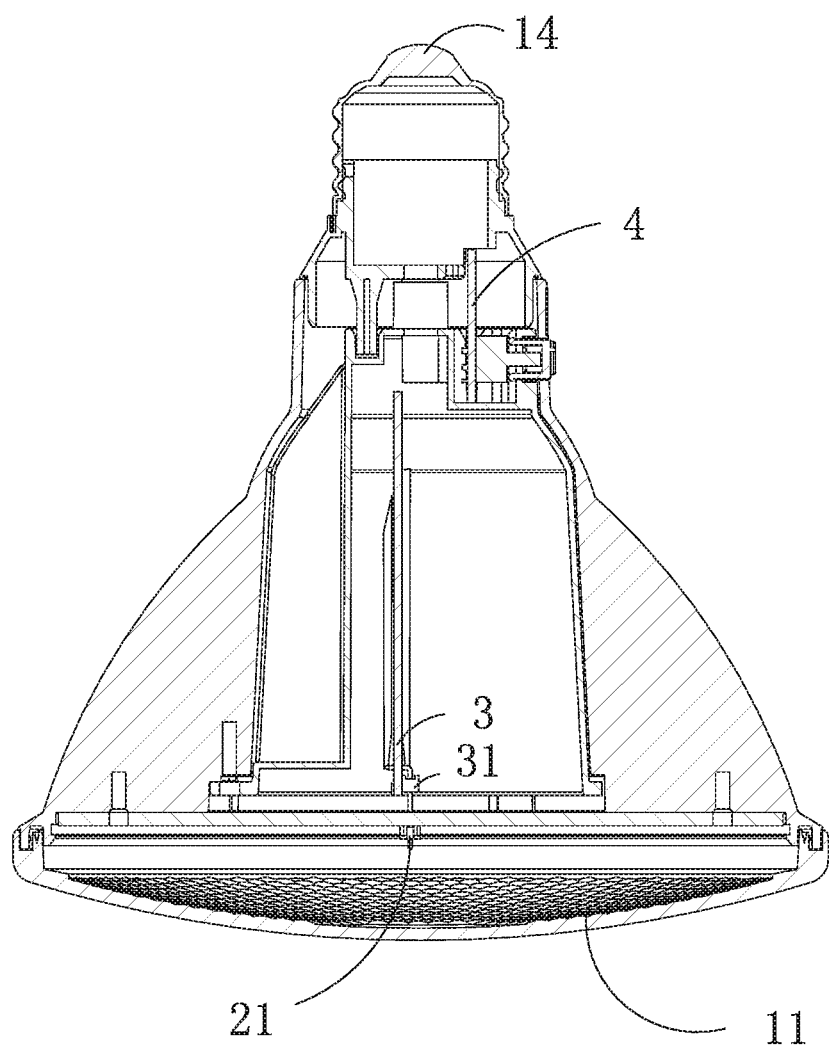
FIG. 3 is a sectional view of Embodiment 1 of the application.
Figure 4:
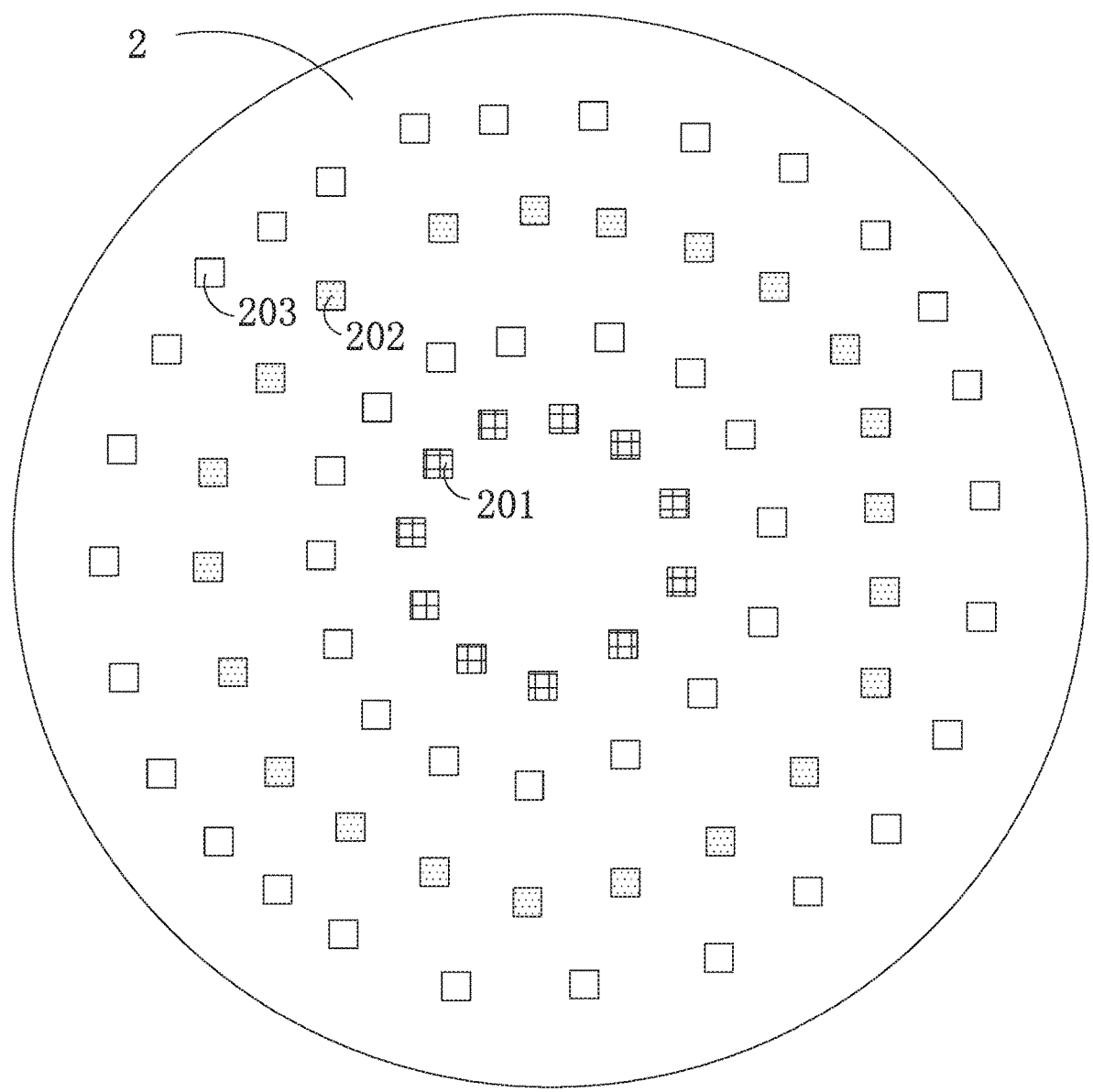
FIG. 4 is an arrangement diagram of light sources in Embodiment 1 of the application.
Figure 5:
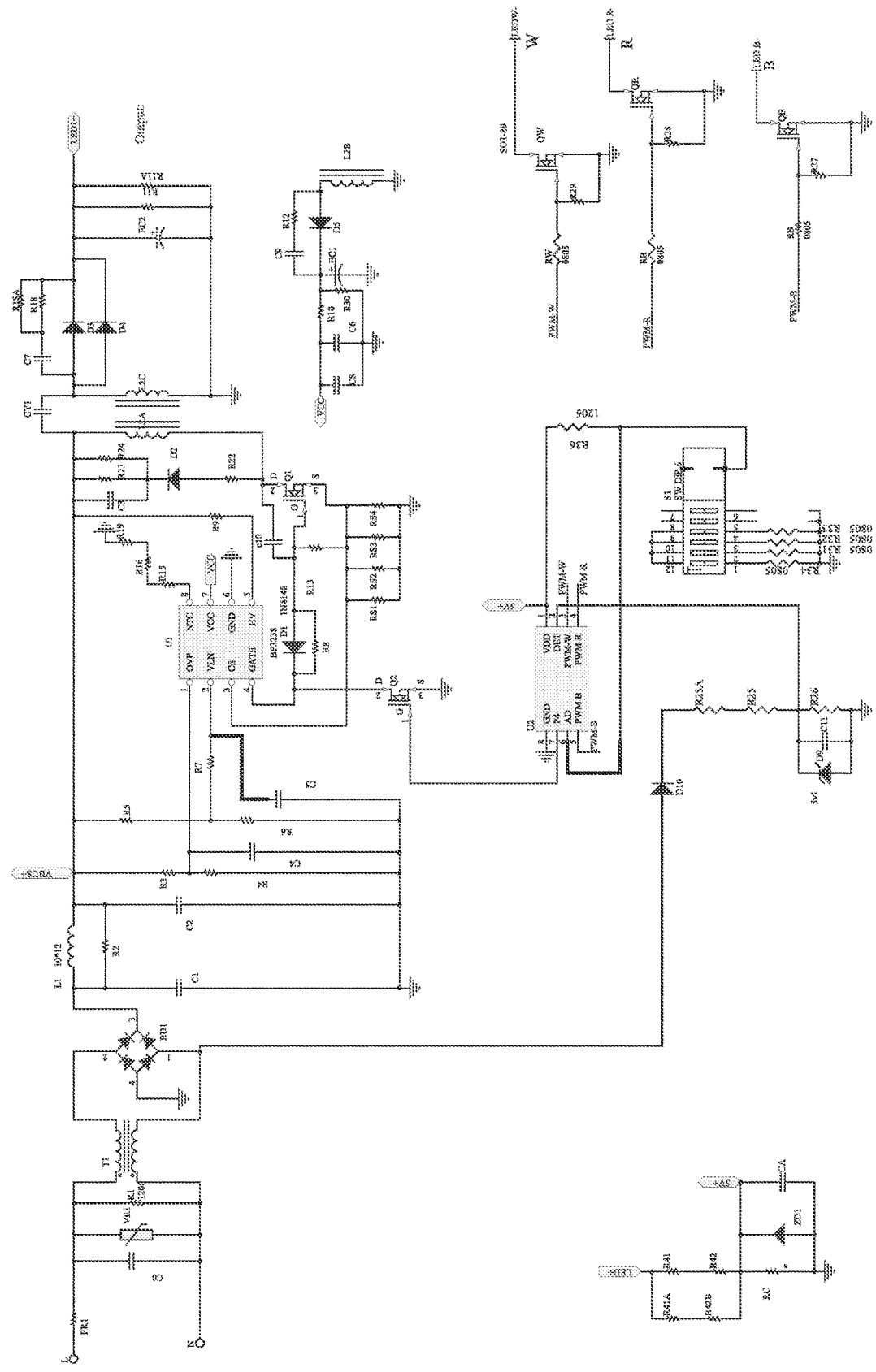
FIG. 5 is a circuit diagram in Embodiment 1 of the application.

As shown in FIG. 1 to FIG. 5, a plant growth lamp comprises a main lamp body, light sources, a switching circuit, and a driving board 3, wherein the driving board 3 is connected to the light sources to drive the light sources to emit light; the switching circuit includes a multi-position switch S1 and a plurality of resistors (R31, R32, R33, and R34 shown in FIG. 5) with different resistances, and a specific circuit connection relationship is shown in FIG. 5 and will not be repeated here any longer; the light sources include a red light source (a wavelength band having a dominant wavelength of 650 nm), a blue light source (a wavelength band having a dominant wavelength of 450 nm), and a white light source (wide-spectrum white light having a dominant wavelength of 470 nm); the driving board 3 is provided with a driving circuit, a main control circuit, and switch circuits, wherein the switching circuit, the switch circuits, and the driving circuit are respectively connected to the main control circuit, the driving circuit is used to drive the red light source, the blue light source, and the white light source, the switch circuits include a first switch circuit, a second switch circuit, and a third switch circuit which are respectively used to control the operating states of the red light source, the blue light source, and the white light source, and the main control circuit correspondingly controls on-off of the first switch circuit, the second switch circuit, and the third switch circuit according to input signals provided by the switching circuit.

The multi-position switch S1 is switched to access the resistors with different resistances to the switching circuit to change the signals input to the main control circuit, which in turn correspondingly controls the on-off of the first switch circuit, the second switch circuit, and the third switch circuit to drive the light sources to output different spectrums, so that the plant growth lamp can independently output different spectrums to satisfy the needs of crops on the spectrums in different stages, thus reducing operating and economic costs of plant growth lamp replacement.

In this embodiment, the plant growth lamp further comprises a light source board; the red light source is composed of a plurality of red light sources 201, the blue light source is composed of a plurality of blue light sources 202, and the white light source is composed of a plurality of white light sources 203. LED light sources are energy-efficient and environmentally-friendly, can respond quickly, and are not prone to attracting heat-loving insects. In other embodiments, other light sources may be used. As shown in FIG. 4, the plurality of red light sources 201, the plurality of blue light sources 202, and the plurality of white light sources 203 are respectively arranged annularly, and a red light source ring, a white light source ring, a blue light source ring, and a white light source ring are sequentially and concentrically arranged on the light source board 2 from the center of the light source board 2 to outside. The plant growth lamp is used for plant lighting, needs a few red light sources and a few blue light sources, and achieves a simple layout by arranging the light sources of the same color together, thus saving a large quantity of 0Ω resistors and reducing the cost. FIG. 4 only shows an illustrative arrangement diagram of the light sources. An actual arrangement of the light sources is set by those skilled in the art as required.

In this embodiment, the number ratio of the red light sources 201, the blue light sources 202, and the white light sources 203 is 26:26:65. When the number ratio of the white light sources and the blue light sources is 65:26 (2.5:1), a spectral band most suitable for a seed stage of plants is output; when the number ratio of the white light sources and the red light sources is 65:26 (2.5:1), a spectral band most suitable for a flower stage of the plants is output; and the wide-spectrum white light sources having a dominant wavelength of 470 nm output a spectral band suitable for a grow stage of the plants. In other embodiments, these number ratios are set by those skilled in the art as required.

In this embodiment, the main control circuit is implemented based on a single-chip microcomputer U2 which is small in size, convenient to use, and low in energy consumption. As shown in FIG. 5, the single-chip microcomputer U2 has a power pin VDD connected to a power supply, output pins PWM-R, PWM-B, and PWM-W respectively connected to control input terminals of the first switch circuit, the second switch circuit, and the third switch circuit, and an input pin AD connected to the switching circuit. The specific circuit connection relationship is shown in FIG. 5 and will not be repeated here any longer.

In this embodiment, the first switch circuit, the second switch circuit, and the third switch circuit are respectively implemented based on MOS transistors QR, QB, and QW. The MOS transistors have low costs, low on voltage drops, and high drive capabilities.

In this embodiment, the plant growth lamp further comprises a switch board 4 on which the multi-position switch is arranged; the main lamp body includes a bulb cover 11, a heat sink 12, an upper driving shell 13, and a lamp cap 14, wherein the upper driving shell 13 is arranged in the conical heat sink 12 and allows the driving board 3 to be inserted thereinto; the light source board 2 is arranged on the heat sink 12 covered with the bulb cover 11; the switch board 4 is inserted into the top of the upper driving shell 13; a switch cap of the multi-position switch penetrates through a recess hole in the side face of the top of the heat sink 12; and the lamp cap 14 is arranged at the top of the heat sink 12. In other embodiments, a control line may be led from the multi-position switch to transmit electrical signals to control position switching of the multi-position switch, so that unified control over a plurality of plant growth lamps can be realized.

The driving board 3 is connected to the light source board 2 through a terminal having male terminals 31 fixed to the driving board 3 as well as female terminals 21 fixed to the light source board 2. When installed, the light source board 2 can be conveniently assembled by means of the connection between the female terminals 21 on the light source board 2 and the male terminals 31 on the driving board 3.

In this embodiment, to facilitate installation of the switch board 4, the main lamp body 1 further includes an upper lamp cap cover 15, which covers the top of the heat sink 12 and has a top screwed with the lamp cap 14.

In this embodiment, an indication marker 6 is arranged on the upper portion of the switch cap according to the light-emitting states of the light sources when the multi-position switch is switched to different positions. Particularly, four positions, namely a switch position, a flower position, a grow position, and a seed position, are set. When switched to the switch position, the multi-position switch can directly control, by means of an external master switch connected to the plant growth lamp, the plant growth lamp to output the spectrums suitable for the flower stage, grow stage, and seed stage of the plants; when switched to the flower position, the multi-position switch controls the white light source and red light source of the plant growth lamp to output the spectrum suitable for the flower stage of the plants; when switched to the grow position, the multi-position switch controls the white light source of the plant growth lamp to output the spectrum suitable for the grow stage of the plants; and when switched to the seed position, the multi-position switch controls the white light source and blue light source of the plant growth lamp to output the spectrum suitable for the seed stage of the plants. The indication marker 6 can be correspondingly set by those skilled in the art according to different spectrums output by the red light source, the blue light source, and the white light source of the plant growth lamp and will not be listed in detail here any longer.

In this embodiment, the upper driving shell 13 and the heat sink 12, the light source board 2 and the heat sink 12, as well as the upper lamp cap cover 15 and the upper driving shell 13 are locked through screws, so that disassembly and maintenance are facilitated, the light source board 2 having different light sources arranged thereon is easy to install, and parts can be sorted and recycled.

In this embodiment, the light source board 2 is coated with heat-conducting silicone grease which can facilitate heat dissipation of the light source board 2, and heat generated by the light sources is uniformly transferred to the heat sink 12 by means of the heat-conducting silicone grease, so that the plant growth lamp can be prevented against damage caused by overheating.

Embodiment 2

Figure 6:
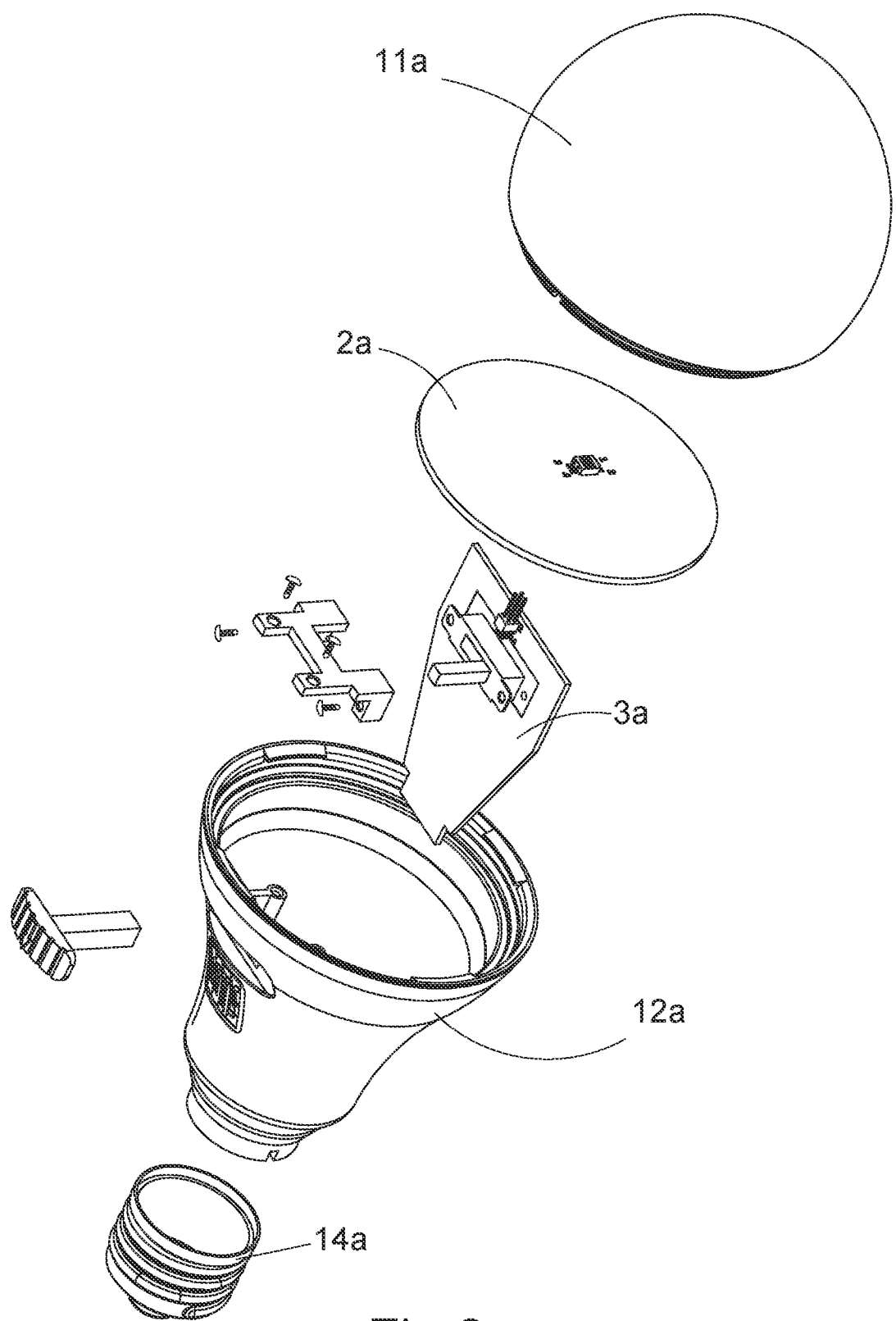
FIG. 6 is an exploded view of Embodiment 2 of the application.

As shown in FIG. 6, the main lamp body includes a bulb cover 11a, a heat sink 12a, and a lamp cap 14a, wherein the driving board 3a and the light source board 2a are arranged in the conical heat sink 12a covered with the bulb cover 11a; the multi-position switch is arranged on the driving board 3a; a switch cap of the multi-position switch penetrates through a recess hole in the side wall of the heat sink 12a; and the lamp cap 14a is screwed to the top of the heat sink 12a. Compared with Embodiment 1, this embodiment is simpler in structure.

It should be noted that the bulb cover 11a, the lamp cap 14a, the driving board 3a, the light source board 2a, and the heat sink 12a in Embodiment 2, which are different in appearance from the bulb cover 11, the lamp cap 14, the driving board 3, the light source board 2, and the heat sink 12 in Embodiment 1, are essentially the same as them in Embodiment 1.

Obviously, the above embodiments of the application are only illustrative ones used for explaining the application more clearly, and are not intended to limit the implementations of the application. Those ordinarily skilled in the art can make different transformations or changes in other forms based on the above explanation. It is unnecessary and unable to exhaustively illustrate all possible implementations of the application. The obvious transformations or changes derived from the explanation should also fall within the protection scope of the application.

What is claimed is:
1. A plant growth lamp comprising:
a main lamp body;
a red light source provided in the main lamp body;
a blue light source provided in the main lamp body;
a white light source provided in the main lamp body;
a driving board connected to the light sources to drive the light sources to emit light;
a switching circuit including a first switch circuit configured to control operation of the red light source, a second switch circuit configured to control operation of the blue light source, a third switch circuit configured to control operation of the white light source, and a multi-position switch for selecting an illumination mode and
a main control circuit configured to provide a signal to the switch circuits to control operation of the driving board to energize the light sources to emit a different combined spectrum according to the selected illumination mode;
the plant growth lamp further comprising a light source board, wherein the red light source includes a plurality of red light sources, the blue light source includes a plurality of blue light sources, and the white light source includes a plurality of white light sources; the plurality of red light sources are arranged to form a central ring, the plurality of blue light sources are arranged to form a middle ring, and the plurality of white light sources are arranged to form an outer ring, and the central, middle and outer rings are concentrically arranged on the light source board from a center of the light source board to outside.

2. The plant growth lamp according to claim 1, wherein a number ratio of the red light sources, the blue light sources, and the white light sources is 26:26:65.

3. The plant growth lamp according to claim 1, wherein the main control circuit is implemented using a single-chip microcomputer.

4. The plant growth lamp according to claim 1, wherein the first switch circuit, the second switch circuit, and the third switch circuit are respectively implemented using MOS transistors.

5. The plant growth lamp according to claim 1, further including:
   a bulb cover;
   a heat sink having a top face, a side face, and a recess hole formed in the side face; and
   a lamp cap threadably coupled to the top face of the heat sink; and
   a switch cap penetrating through the recess hole of the heat sink and coupled to the multi-position switch,
   wherein the driving board and the light source board are arranged in the heat sink and covered with the bulb cover and the multi-position switch is arranged on the driving board.

6. The plant growth lamp according to claim 1, further including a heat-conducting silicone grease layer coating the light source board.

7. The plant growth lamp according to claim 1, further comprising:
   a switch board on which the multi-position switch is arranged;
   a bulb cover;
   a heat sink having a top face, a side face, and a recess hole formed in the side face;
   an upper driving shell;
   a lamp cap arranged on the top face of the heat sink; and
   a switch cap penetrating through the recess hole of the heat sink and coupled to the multi-position switch,
   wherein the upper driving shell is arranged in the heat sink and allows the driving board to be inserted thereinto, the light source board is arranged on the heat sink and covered with the bulb cover, the switch board is inserted into a top of the upper driving shell.

8. The plant growth lamp according to claim 7, wherein the main lamp body further includes an upper lamp cap cover, which covers the top of the heat sink and has a top portion threadably coupled to the lamp cap.

* * * * *